United States Patent
Vankamamidi et al.

(10) Patent No.: US 11,366,609 B2
(45) Date of Patent: Jun. 21, 2022

(54) TECHNIQUE FOR ENCODING DEFERRED REFERENCE COUNT INCREMENTS AND DECREMENTS

(71) Applicant: EMC IP Holding Company LLC, Hopkinton, MA (US)

(72) Inventors: Vamsi Vankamamidi, Hopkinton, MA (US); Philippe Armangau, Acton, MA (US); Ashok Tamilarasan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 16/529,956

(22) Filed: Aug. 2, 2019

(65) Prior Publication Data

US 2021/0034292 A1    Feb. 4, 2021

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0665* (2013.01); *G06F 3/0673* (2013.01)

(58) Field of Classification Search
CPC ...... G06F 3/0659; G06F 3/0604; G06F 3/064; G06F 3/0673; G06F 3/0665; G06F 3/0608; G06F 3/0683; G06F 3/0641
See application file for complete search history.

(56) References Cited

U.S. PATENT DOCUMENTS

| | | | | |
|---|---|---|---|---|
| 8,117,160 | B1* | 2/2012 | Tang | G06F 16/128 707/639 |
| 8,751,763 | B1* | 6/2014 | Ramarao | G06F 16/1752 711/162 |
| 9,483,207 | B1* | 11/2016 | Srivastava | G06F 3/0608 |
| 2013/0297885 | A1* | 11/2013 | Hyde, II | G06F 12/122 711/136 |
| 2018/0060367 | A1* | 3/2018 | Ioannou | G06F 16/2272 |

* cited by examiner

*Primary Examiner* — Tasnima Matin
(74) *Attorney, Agent, or Firm* — Krishnendu Gupta; Deepika Bhayana; Derek Lam (57) ABSTRACT

A method, system, and computer program product for encoded virtual block deferred reference counting comprising receiving an input/output ("IO") request for data, the data associated with a virtual block, updating a reference count structure to reflect the IO request, and updating, out of line from the IO request, one or more reference counts associated with the virtual block to reflect the result of the IO request based on the updated reference count structure.

18 Claims, 8 Drawing Sheets

TECHNIQUE FOR ENCODING DEFERRED REFERENCE COUNT INCREMENTS AND DECREMENTS

CROSS REFERENCE TO RELATED APPLICATIONS

This application is related to co-pending U.S. patent application Ser. No. 16/458,496 entitled MULTI-GENERATIONAL VIRTUAL BLOCK COMPACTION filed on Jul. 1, 2019, which is incorporated herein by reference.

BACKGROUND

Technical Field

This application relates to data storage systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Such a data storage system typically includes processing circuitry and a set of disk drives (disk drives are also referred to herein as simply "disks" or "drives"). In general, the processing circuitry performs load and store operations on the set of disk drives on behalf of the host devices. In certain data storage systems, the disk drives of the data storage system are distributed among one or more separate disk drive enclosures (disk drive enclosures are also referred to herein as "disk arrays" or "storage arrays") and processing circuitry serves as a front-end to the disk drive enclosures. The processing circuitry presents the disk drive enclosures to the host device as a single, logical storage location and allows the host device to access the disk drives such that the individual disk drives and disk drive enclosures are transparent to the host device.

Disk arrays are typically used to provide storage space for one or more computer file systems, databases, applications, and the like. For this and other reasons, it is common for disk arrays to be structured into logical partitions of storage space, called logical units (also referred to herein as LUs or LUNs). For example, at LUN creation time, storage system may allocate storage space of various storage devices in a disk array to be presented as a logical volume for use by an external host device. This allows a disk array to appear as a collection of separate file systems, network drives, and/or volumes. Disk arrays may also include groups of physical disks that are logically bound together to represent contiguous data storage space for applications.

It is desirable to efficiently manage and monitor data storage systems for a variety of different reasons, such as, for example, to more efficiently use the resources required to store and manage data.

SUMMARY OF THE INVENTION

Embodiments of this disclosure relate to a method, system, and computer program product for encoded virtual block deferred reference counting comprising receiving an input/output ("IO") request for data, the data associated with a virtual block, updating a reference count structure to reflect the IO request, and updating, out of line from the IO request, one or more reference counts associated with the virtual block to reflect the result of the IO request based on the updated reference count structure.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for use in, for example encoded virtual block deferred reference counting, which technique may be used to provide, among other things, receiving an IO request for data, the data associated with a virtual block, updating a reference count structure to reflect the IO request, and updating, out of line from the IO request, one or more reference counts associated with the virtual block to reflect the result of the IO request based on the updated reference count structure.

In some embodiments, data storage systems can use a log-structured file system to store data. A log-structured file system can provide speed advantages over other forms of data storage by, for example, grouping a series of writes of data, rather than writing each piece of data separately. In this way, efficiencies can be realized by decreasing the amount of input/output (IO) between an application and underlying data storage. In a log-structured file system, all writes are performed sequentially, such that a write performed at time t1 is physically located sequentially following a write performed at time t0. This technique is also used when updating or overwriting data, such that rather than updating the previously written data in place (which typically requires searching for the previously written data, which can be time-consuming), the log-structured file system keeps track of the last position in physical storage used to write data most recently (which data may be unrelated to the data to be updated), and writes the updated data to a new location—typically sequentially following the most recently written data—and updates the new end position of the written data. In addition, pointers pointing to the old data are updated to point to the newly written data, reflecting the fact that the data has been updated such that reads will now return the new data rather than the old data. In some embodiments, a collection of logical blocks and/or virtual blocks are used to provide data services to users and/or applications. In a log-structured file system, a collection of logical blocks—sometimes arranged in a tree structure—can be used to provide a way to map locations of data stored on physical storage for use by other applications. This technique is sometimes known as establishing a logical block address (LBA). In some embodiments, each logical block in the collection is the same size, for example 4K bytes. In some embodiments each logical block is associated with an address where the logical block is located (for example, an address in volatile memory, or in persistent memory, or the like). In some embodiments, each logical block can store metadata, e.g., pointers, a generation number (explained below), and the like. In some embodiments, pointers are used to associate one instrumentality (e.g., data, block, and the like) with another. In some embodiments information is associated with a block by being stored in the block. In some embodiments, each logical block's storage is arranged in 4K pages. In some embodiments, logical blocks' storage contains pointers, e.g., up to 512 pointers in the case of a 4K logical block. In some embodiments, each pointer takes up 7 bytes. In some embodiments, the storage that is not used for pointers is used for storing other information (e.g., metadata, pointer offsets, lookup tables, and the like). In some embodiments, each pointer in each logical block is associated with an index that indicates where in a logical block a particular pointer is located. In some embodiments, each pointer includes an address (e.g., of another block) and an index or offset to a particular location, which when combined with the address identifies a particular location within, for example, a block located at the respective address. In some embodiments, a tree structure of logical blocks is arranged in three levels; a top-level logical block, a number of mid-level logical blocks (typically corresponding to the number of pointers in the top level block, e.g., 512 mid-level 4K blocks), and a number of leaf logical blocks (typically corresponding to the number of pointers in the mid-level blocks, e.g., 512*512 4K blocks). In this way, data written to, e.g., physical location 1 (assuming locations start with address 0), would be located by starting at the top-level logical block, following the pointer in location or address 0 that points to mid-level block 0, index 0 (because physical location 1 is within the $0^{th}$ portion of the 512 GB addressed by the top LB), following the pointer in index 0 of mid-level block 0 that points to leaf block 0, index 1 (because physical location 1 is within the $0^{th}$ portion of the 1 GB addressed by the $0^{th}$ mid LB), and following the pointer in index 1 of leaf block 0 (because physical location 1 is within the $1^{st}$ portion of the 2 MB addressed by the $0^{th}$ leaf LB). In addition, virtual blocks can be used in a layer in between the logical blocks and the physical data storage to provide a mapping between logical blocks and physical blocks and to provide data storage services, such as deduplication and compression. In some embodiments, deduplication can be accomplished by having multiple pointers in leaf blocks point to the same index in the same virtual block. For example, assume a request is received at time t0 to write string A to physical storage. String A will be stored in physical storage at location N, and a virtual block V will be updated to point to physical storage location N. A collection of logical blocks will be updated to point to V to represent the physical location N. At a future time t1, a request is received to store string A. Rather than writing another copy of A to a new physical storage location, and having another virtual block V1 (or a different location within V) point to a new physical location N1 and pointed to by a new collection of logical blocks, the system can track that V is being used to point to the same data multiple times from the same logical block collection. In some embodiments, a reference count can be used for this tracking. In some embodiments, a respective reference count is updated to reflect deduplication; for example, a reference count can be incremented to reflect a new instance of deduplication of a piece of data, or a reference count can be decremented to reflect an overwrite or deletion of a duplicated piece of data. In some embodiments, updating a reference count is deferred, for example, by being performed in the background or out of line from receiving the write request. In some embodiments, a reference count is incremented inline to receiving the write request. In some embodiments, a reference count is decremented out of line from receiving the write request. In some embodiments, the reference count can be stored within the respective virtual block. In some embodiments, each location within each virtual block that points to physical storage can include a reference count. In some embodiments, the leaf block pointers point to virtual blocks and the virtual blocks point to physical storage. In some embodiments, the virtual blocks are the same size as the logical blocks, e.g., 4K bytes. In some embodiments, compression can be accomplished by compressing the data to be written to a physical block, writing the compressed data to physical storage, and saving the size and location of the compressed data in the associated virtual block; in this way when a read is requested for the written data, the compressed data can be retrieved, decompressed, and sent back to the requestor. In some embodiments, each virtual block contains a fixed number of pointers, e.g. 512 in the case of a 4K virtual block. In some embodiments, when data located at a particular physical location is to be updated/overwritten, the pointer at the corresponding index in the corresponding virtual block is no longer of use (because in the log-structured file system, the data is written to a new location rather than updating the old location). In some embodiments, to represent that a pointer is no longer of use, a specific value may be written into the pointer's location in storage, for example hexadecimal FFFF. Over time, as more data is targeted to be overwritten, the virtual blocks can become sparse (e.g., containing more and more 0s in the indices) as the virtual blocks point to fewer and fewer in-use data (sometimes known as "live" or "active" data), leading to inefficiency in the amount of resources used. For example, even though most of a virtual block's indices may be available to point to new data, because the virtual block may still point to some active data, a fresh virtual block may be allocated when writing new data, rather than using an existing virtual block with available indices for pointers. If the system were to attempt to reuse the areas of inactive data, that would lead to mixing hot data (recently written) and cold data (not accessed for a certain period of time) in the virtual blocks, which would lead to other inefficiencies; for example, interfere with the ability to promote hot data to faster storage, which is desirable.

In some embodiments, using reference counts as described above, for example for deduplication, it is desirable to defer updating reference counts because, for example, input/output ("IO") requests should be handled quickly without extra delay. Updating a reference count can cause delays or increased resource (e.g., memory) usage and is typically too IO or and/or resource intensive for a live system. For example, updating a reference count (e.g., when overwriting duplicated data and needing to decrement that associated reference count) within a virtual block may require reading a page into cache for every IO (and may also require evicting a page from cache that would otherwise be kept in and utilized).

It is important to efficiently manage resource utilization in a log-structured file system to keep costs down and keep data throughput up. Typically, it has been difficult in data storage environments to efficiently manage resource utilization in a log-structured file system. Typically, more resources are used by virtual blocks as more data is updated or overwritten. This can lead to slower throughput as resource availability decreases and increased costs (for example, by needing to use larger amounts of memory, storage, and compute resources).

By contrast, in at least some embodiments in accordance with the technique described below, a method and system are provided for an improved utilization of resources within a data storage system by encoded virtual block deferred reference counting. Thus, in at least one embodiment of the current technique, a user of a system is able to better utilize resources within a data storage system by deferred virtual block deferred reference counting by the system receiving an IO request for data, the data associated with a virtual block, updating a reference count structure to reflect the IO request, and updating, out of line from the IO request, one or more reference counts associated with the virtual block to reflect the result of the IO request based on the updated reference count structure. And in at least one embodiment of the current technique, a user of the system is able to better utilize resources within a data storage system by the system enabling updating the reference count structure, wherein updating the reference count structure comprises, storing an entry in the reference count structure, wherein the entry comprises a reference to the virtual block and a consecutive block count.

In at least some embodiments in accordance with the techniques as described herein, the use of the way to better utilize resources within a data storage system can provide one or more of the following advantages: lower the amount of storage required, lower the cost of the overall data storage system, increased data throughput, increase the life of the memory and/or storage medium (e.g., increased flash memory life by reducing the number of write and erase cycles), and the like.

Figure 1:
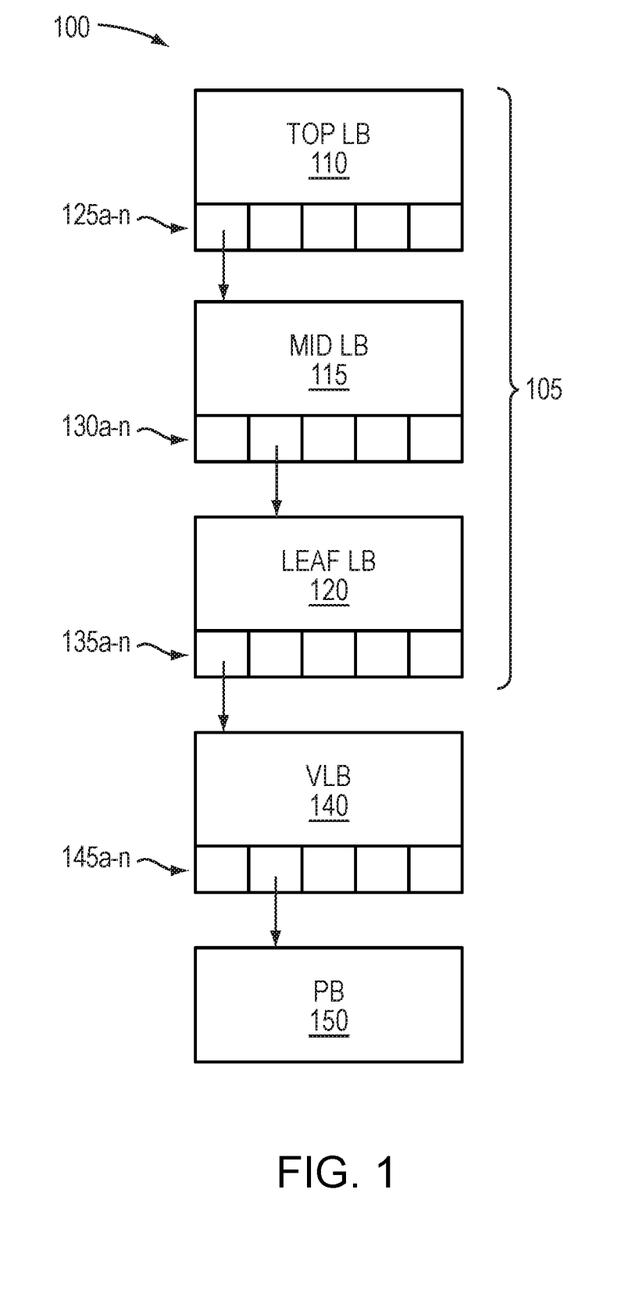
FIG. 1 is a simplified block diagram of an example system, in accordance with an embodiment of the present disclosure.

FIG. 1 depicts an example embodiment of a system that may be used in connection with performing the techniques described herein. In some embodiments, a data storage environment 100, sometimes also known as a map, includes a collection of logical blocks 105, virtual blocks 140, and physical blocks 150. In some embodiments, applications (not shown) send data write commands and associated data to the data storage system 100. In some embodiments, the data write commands and associated data are cached. In some embodiments, when the cache becomes full, the cache is flushed to physical blocks 150, wherein the map 100 is created in response to the flush. Physical storage 150 may be actual physical storage such as hard disk, flash, or the like, or may be virtual storage, for example a one or more virtual machine disks. In some embodiments, each logical block 105 in the map 100 is of the same size, e.g., 4K bytes. In some embodiments, the map 100 is arranged in a multi-level tree structure as shown, although other embodiments are possible, such as a two-level tree, or a flat table that maps the logical location with the physical location. In some embodiments, the map 100 includes a top-level logical block (top LB) 110. In some embodiments, the map 100 includes one or more mid-level logical blocks (mid LB) 115. In some embodiments, the map 100 includes one or more leaf logical blocks (leaf LB) 120. In some embodiments, the top LB 110 has one or more pointers 125$a$-$n$ associated with it. In some embodiments the one or more pointers 125$a$-$n$ are located within the top LB 110 at indices, whereby each of the one or more pointers 125$a$-$n$ is located at a different index within top LB 110. In some embodiments, the one or more pointers 125$a$-$n$ each point to a mid LB 115. In some embodiments, each mid LB 110 has one or more pointers 130$a$-$n$ associated with it. In some embodiments the one or more pointers 130$a$-$n$ are located within each of the respective one or more mid LBs 115 at indices, whereby each of the one or more pointers 130$a$-$n$ is located at a different index within each of the respective one or more mid LBs 115. In some embodiments, the one or more pointers 130$a$-$n$ each point to a leaf LB 120. In some embodiments, each leaf LB 120 has one or more pointers 135$a$-$n$ associated with it. In some embodiments the one or more pointers 135$a$-$n$ are located within each of the respective one or more leaf LBs 120 at indices, whereby each of the one or more pointers 135$a$-$n$ is located at a different index within each of the respective one or more leaf LBs 120. In some embodiments, the one or more pointers 135$a$-$n$ each point to a virtual block (VLB) 145.

In some embodiments, each VLB 140 has one or more pointers 145$a$-$n$ associated with it. In some embodiments the one or more pointers 145$a$-$n$ are located within each of the respective one or more VLBs 140 at indices, whereby each of the one or more pointers 145$a$-$n$ is located at a different index within each of the respective one or more VLBs 140. In some embodiments, the one or more pointers 145$a$-$n$ each point to a block (PB) 150 in physical storage, where the actual data associated with the write command is stored.

In some embodiments, the pointers 125$a$-$n$, 130$a$-$n$, 135$a$-$n$, and 145$a$-$n$ are a combination of an address of the block pointed to and an index within the pointed to block. In some embodiments, the address of the block pointed to and the index within the pointed to block are encoded into a single value. In some embodiments, the address of the block pointed to and the index within the pointed to block are stored as separate values and used together or combined when needed (e.g., when locating the actual contents at the specific location being referenced). In this way, the map 100 can be traversed by following the pointers.

Figure 2:
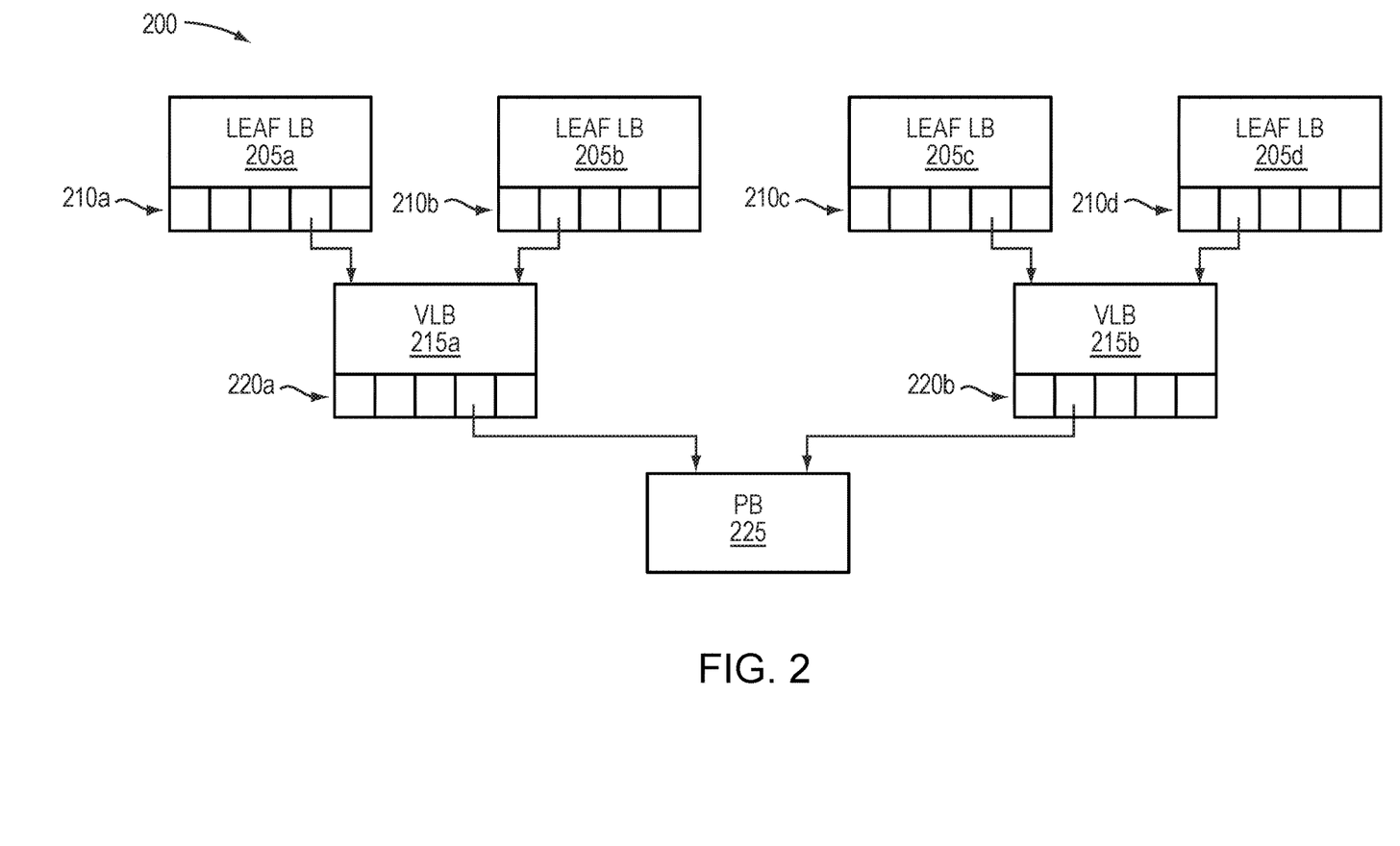
FIG. 2 is a simplified block diagram of an example system, in accordance with an embodiment of the present disclosure.

FIG. 2 depicts an example embodiment of a system that may be used in connection with performing the techniques described herein. Shown is an example portion of a map as described in FIG. 1. In some embodiments, leaf LBs 205a-d contain pointers in storage 210a-d, respectively to VLB 215a and VLB 215b. As shown, leaf LB 205a points to VLB 215a through a pointer in location 3 (e.g., 0-indexed, although other techniques are contemplated: 1-indexing, lookup table, and the like) of the storage 210a of leaf LB 205a. Leaf LB 205b points to VLB 215a through a pointer in location 1 of the storage 210b of leaf LB 205b. Leaf LB 205c points to VLB 215b through a pointer in location 1 of the storage 210c of leaf LB 205c. Leaf LB 205d points to VLB 215b through a pointer in location 3 of the storage 210d of leaf LB 205d. In some embodiments, VLB 215a and VLB 215b contain pointers in storage 220a and 22b, respectively, to PB 225. As shown, VLB 215a points to PB 225 through a pointer in location 3 223a of the storage 220a of VLB. VLB 215b points to PB 225 through a pointer in location 1 223b of the storage 220b of VLB 215b. Because, for example, VLB 215a points to PB 225 through a pointer in location 3 223a of the storage 220a of VLB 215a, the pointer in location 3 of the storage 210a of leaf LB 205a includes the address of VLB 215a and an offset 3 (corresponding to location 3 223a in the storage 220a of VLB 215a).

In some embodiments, virtual blocks VLB 215a, 215b can be used to support deduplication. For example, if location 3 in the storage 210a of leaf LB 205a and location 1 in the storage 210b of leaf LB 205b both reference the data with the same value (e.g., the string "ABCDE") stored in physical storage PB 225, rather than the respective locations in Leaf LB 205a and leaf LB 205b pointing to different virtual blocks or different locations within the storage of the same virtual block, e.g., 215a, the respective locations in in Leaf LB 205a and leaf LB 205b can both point to the same location 223a in the storage 220a of the same VLB 215a, which itself points to the location of the data (e.g., the string "ABCDE") within PB 225.

In some embodiments, reference counters can be used to track the number of leaf LBs pointing to each VLB. In some embodiments, virtual blocks can use reference counters stored within the virtual blocks to track the number of leaf blocks pointing to them. In some embodiments, each VLB location 223a in the storage 220a of each VLB 215 can contain one reference counter to track the total number of leaf LBs pointing to that location 223a. The reference counters are typically incremented and decremented as the number of leaf blocks pointing to the VLB (or particular storage location) are increased (e.g., as new data is added that is referenced through a particular VLB) or decreased (e.g., as existing data is overwritten for that particular VLB), respectively. However, as described above, updating reference counters inline (e.g., within the same IO path, or blocking or otherwise delaying the IO to update the reference counters) with IO processing (e.g., a request to store new data or overwrite existing data) can be too resource intensive for a live system. In some embodiments, decrementing reference counters (e.g., as the result of overwriting existing data) is performed out of line, as described herein.

Figure 3:
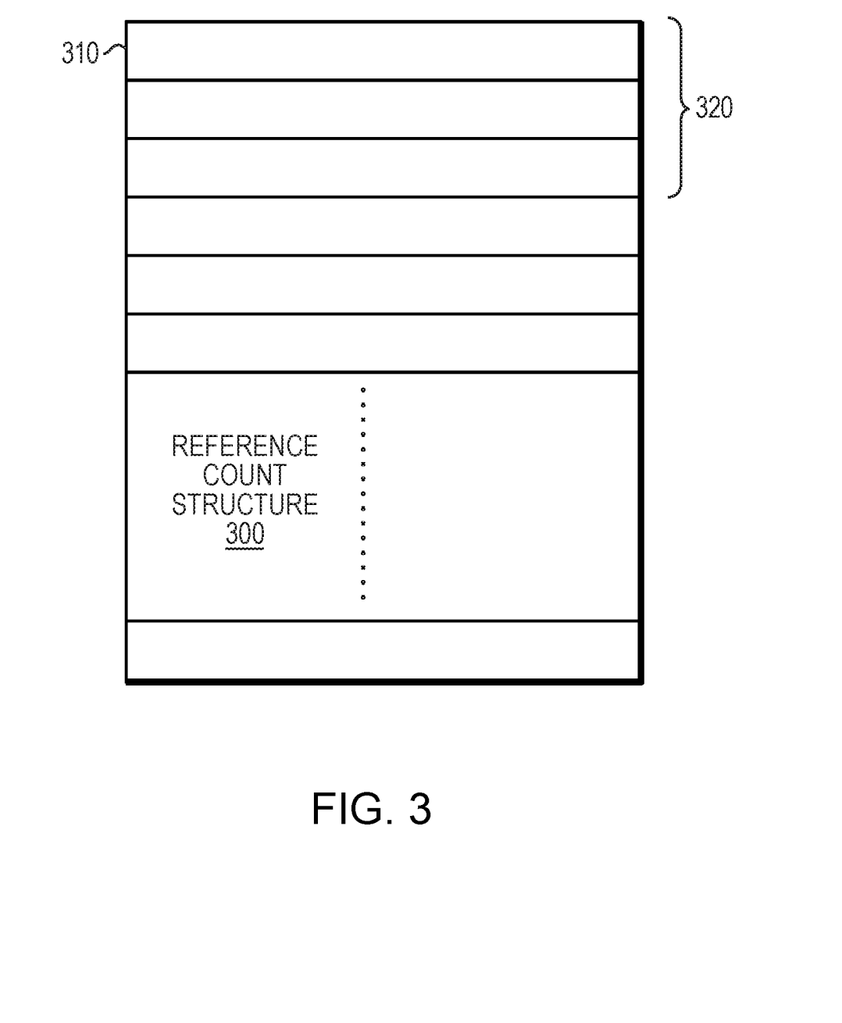
FIG. 3 is a simplified block diagram of an example system, in accordance with an embodiment of the present disclosure.

FIG. 3 depicts an example embodiment of a system that may be used in connection with performing the techniques described herein. Shown is an example portion of a data structure that can be used as a reference count structure 300 to enable more efficient reference counter processing. In some embodiments, reference count structure 300 is a database. In some embodiments, reference count structure 300 is a database table. In some embodiments, reference count structure 300 is a flat file. Other known embodiments for reference count structure 300 are within the scope of this disclosure. Reference count structure contains one or more storage locations 310, also known as entries. In some embodiment, each entry 310 can be a row in a database table. In some embodiments, each entry 310 can be an entry in a lookup table. In some embodiments, each entry 310 can contain a pointer to a virtual block (such as VLB 215a in FIG. 2) and an offset to a VLB storage location (such as 223a) in the pointed to virtual block. In some embodiments, each entry 310 can contain a consecutive block count, which can represent the number of times to decrement a reference count in the respective VLB storage location based on a length of a corresponding write, as described below.

System 200 in FIG. 2 can use a reference count structure 300 as follows. In some embodiments, system 200 receives an IO request for data. In some embodiments, the IO request may be a write of data that has not been written before (i.e. is not a deduplication candidate). In some embodiments, the IO request may be a write of data that has been written before (i.e. is a deduplication candidate). In some embodiments, the IO request may be a request to overwrite previously written data. As described above, when writing or overwriting data system 200 sets up a series of logical blocks, with a leaf LB (e.g., 205a) pointing to a VLB storage location (e.g., 223a) in a VLB (e.g., 215a), which in turn points to PB 225. In this way, the data is associated with VLB 215a. In some embodiments, a reference counter within VLB storage location 223a should be updated (e.g., incremented) to reflect VLB 215a being pointed to by leaf LB 205a. In some embodiments, in the case of an overwrite or deletion, the reference counter within VLB storage location 223a should be updated (e.g., decremented) to reflect VLB storage location 223a no longer being pointed to by the leaf LB associated with the old data to be overwritten. In some embodiments, an entry 310 is added to reference count structure 300 to reflect the need to update the reference counter in VLB storage location 223a to reflect that VLB storage location 223a no longer being pointed to by the leaf LB associated with the old data to be overwritten. In some embodiments, an unused entry 310 in reference count structure 300 can be used. In some embodiments, a new entry 310 is created and used. In some embodiments, the entry 310 includes a reference (e.g., a pointer and offset to a particular VLB storage location) to the VLB whose reference counter needs updating; here, VLB storage location 223a in VLB 215a. In some embodiments, the entry 310 includes a consecutive block count, which represents the consecutive VLB storage locations whose reference counters should be decremented based on the length of the data to be written. For example, assume the basic unit of a write is 4 kilobytes ("4K") (for example, writing in 4K page increments, with padding if a write is less then 4K so that the system always writes in multiple of 4K), if the data to be written is of size 12K, the consecutive block count is 3 because 12K is 3 times 4K. In this way, rather than creating (or updating) three separate entries 310—one for each 4K, a single entry 310 is used that encodes the length of the write, and thus the number of consecutive VLB storage location whose reference counters need updating. Thus, when decrementing the reference associated reference counter in the respective VLB storage location, 2 additional reference counts in consecutive VLB storage locations are also decremented, for a total of 3. This technique is also sometimes known as amortization. This technique can be useful in: decreasing the amount of storage needed by the reference count structure 300; decrease the number of writes to the reference count structure 300 (e.g., if implemented in flash memory, it is desirable to increase the life of flash memory by decreasing the number of writes); and decrease the amount of time need to update the reference count structure 300 when entries are added and deleted. In this way, the reference count structure 300 is updated to reflect the IO request.

In some embodiments, the reference counter in the storage location 223a of VLB 215a is updated to reflect the result of the IO request. In some embodiments, the updating is based on the reference count structure 300. In some embodiments, the updating is performed out of line from processing the IO request. In some embodiments, the updating is performed as a background process. In some embodiments, the updating is triggered during periods of inactivity or low activity, for example, if about 0-25% of the system's activity (e.g., CPU load) is devoted to IO activity. In some embodiments, the updating is triggered from a garbage collection. In some embodiments, the updating is triggered when the amount of available space for the reference count structure becomes too small, for example if the amount of free space in the system is less than about 10% of the overall capacity. In some embodiments, the updating includes locating all the entries 310 in the reference count structure 300 with a reference for a storage location within a VLB and updating the VLB's storage locations reference counters based on the number of entries found (e.g., decrementing the reference counter in a particular VLB storage location once for each entry 310 for that VLB storage location found in the reference count structure 300. In some embodiments, for each entry 310 for a particular VLB storage location, additional VLB storage location reference counters are updated based on the consecutive block count for a particular entry 310. For example, assume an entry 310 for VLB storage location 232a of VLB 215a has a consecutive block count of 2. This indicates that the reference counter in storage location 232a needs to be updated and that the storage location consecutively following also needs to be updated, because, for example a write of 8K (assuming 4K base unit writes) had been performed, and thus two consecutive leaf LBs pointers—or in the case of the final pointer in one and the first pointer in the next, two leaf LBs—were used for the write. Thus, the need for two different reference counter updates. In some embodiments, after an entry 310 is processed for reference counter updating, it can be removed from reference count structure 310.

In some embodiments, the updating includes arranging the entries 310 in the reference count structure 300 into groups 320 before locating the entries 310 for a VLB. In some embodiments, the entries 310 are grouped by references to VLB storage locations. In some embodiments, the entries within each group 320 are sorted. In some embodiments, the groups 320 are sorted. Grouping the entries 310 is useful, for example, because multiple entries for a VLB storage location may be added at many different points in time, and thus appear in random locations within the reference count structure 300. By appearing in random locations, many more reads would be necessary to process all entries 310 for a VLB storage location. By grouping the entries 310, they can be processed sequentially for a VLB, improving locality of reference, and decreasing the number of reads (e.g., it is more efficient to read a contiguous block of memory than many smaller contiguous blocks or read the same block of memory multiple times).

Figure 4A:
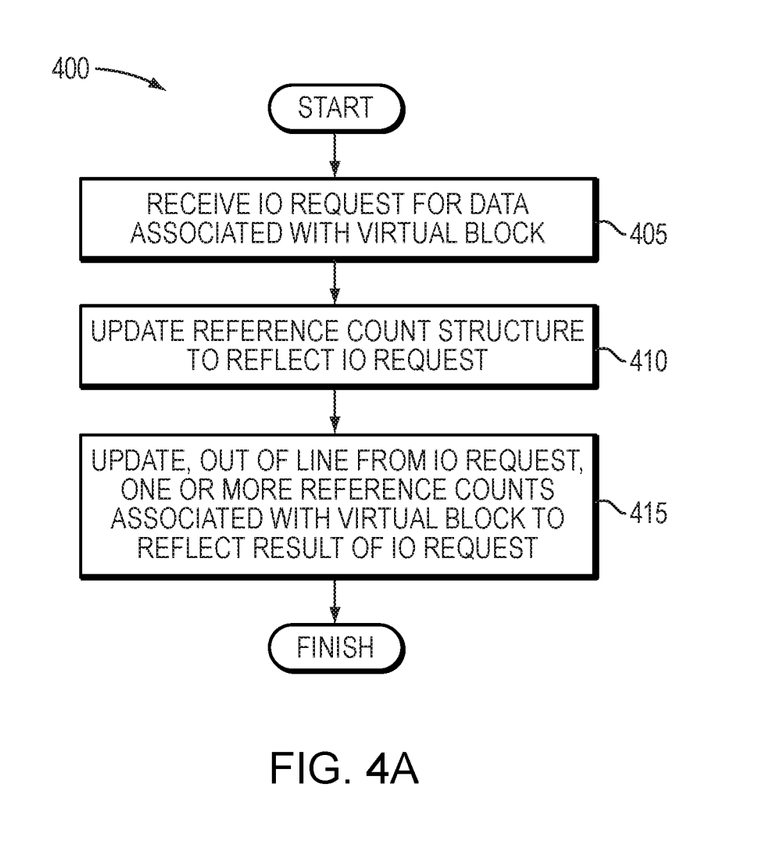
FIGS. 4A, 4B, and/or 4C are a simplified illustration of an example flow diagram, in accordance with an embodiment of the present disclosure.
Figure 4B:
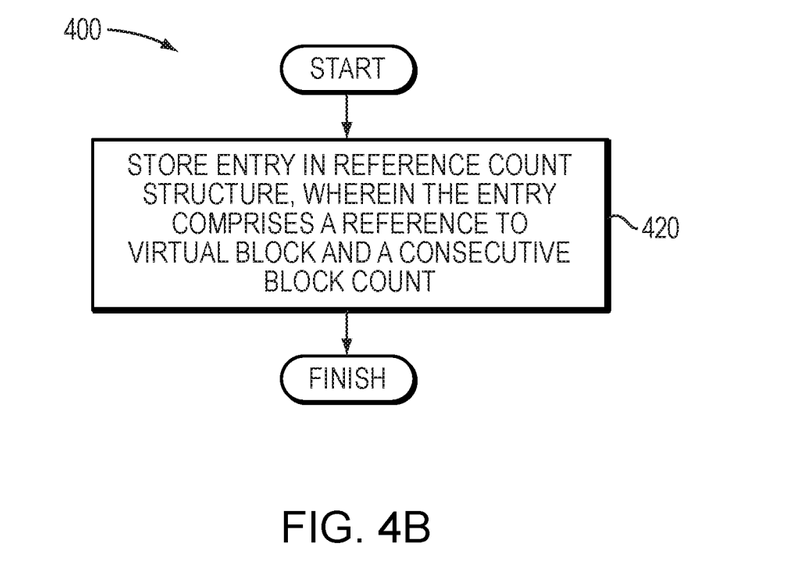
Figure 4C:
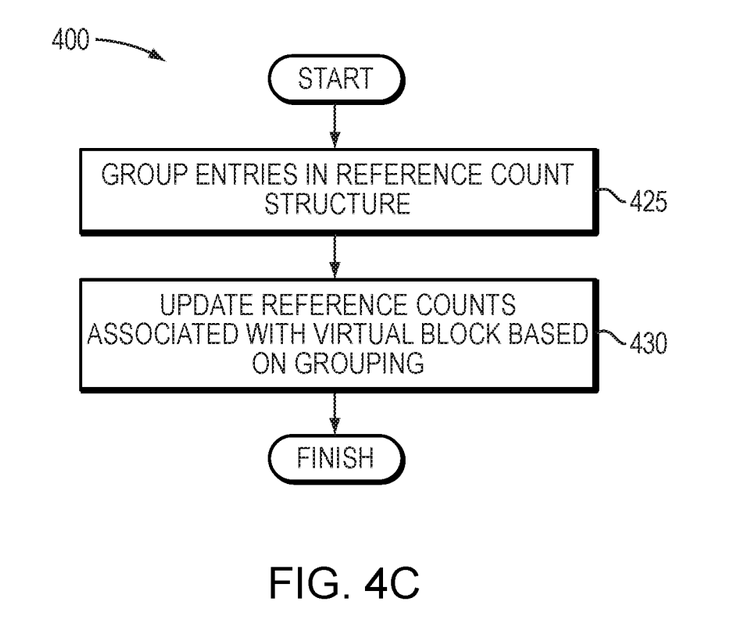

FIGS. 4A, 4B and/or 4C illustrates a flow diagram 400 illustrating an example embodiment of a method that may be used in connection with performing the techniques described herein. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIGS. 4A, 4B, and/or 4C and described below is not intended to be limiting.

In some embodiments, method 400 may be implemented in one or more processing devices (e.g., a digital processor, an analog processor, a digital circuit designed to process information, an analog circuit designed to process information, a state machine, a virtual machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

FIG. 4A illustrates method 400, in accordance with one or more embodiments. An operation 405 may include receiving an IO request for data. In some embodiments, the IO request may be an overwrite or deletion operation. The data may be associated with a first virtual block, for example VLB 215a as explained above. Operation 405 may be performed by one or more hardware processors configured by machine-readable, in accordance with one or more embodiments. An operation 410 may include updating a reference count structure to reflect the IO request (for example, reference count structure 300 in FIG. 3). Operation 410 may be performed by one or more hardware processors configured by machine-readable instructions, in accordance with one or more embodiments. An operation 415 may include updating, out of line from the IO request, one or more reference counts associated with the virtual block 215a to reflect the result of the IO request based on the updated reference count structure 300 (as described above in relation to at least FIG. 2 and FIG. 3). Operation 415 may be performed by one or more hardware processors configured by machine-readable instructions, in accordance with one or more embodiments.

FIG. 4B illustrates method 400, in accordance with one or more embodiments. An operation 420 may include updating the reference count structure 300, wherein updating the reference count structure 300 comprises storing an entry 310 in the reference count structure 300, wherein the entry 310 comprises a reference to the virtual block 215a and a consecutive block count. In some embodiments, the reference to the virtual block 215a comprises an address of the virtual block 215a (e.g., a pointer) and an offset into the VLB storage 220a (e.g., VLB storage location 223a). Operation 420 may be performed by one or more hardware processors configured by machine-readable instructions, in accordance with one or more embodiments.

FIG. 4C illustrates method 400, in accordance with one or more embodiments. Method 400 may include updating the one or more reference counts associated with the virtual block 215a, wherein updating the one or more reference counts associated with the virtual block 215a comprises grouping the entries 310 in the reference count structure 300 (operation 425) and updating the one or more reference counts associated with the virtual block 215a based on the grouping (operation 430). Operations 425 and 430 may be performed by one or more hardware processors configured by machine-readable instructions, in accordance with one or more embodiments.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 5:
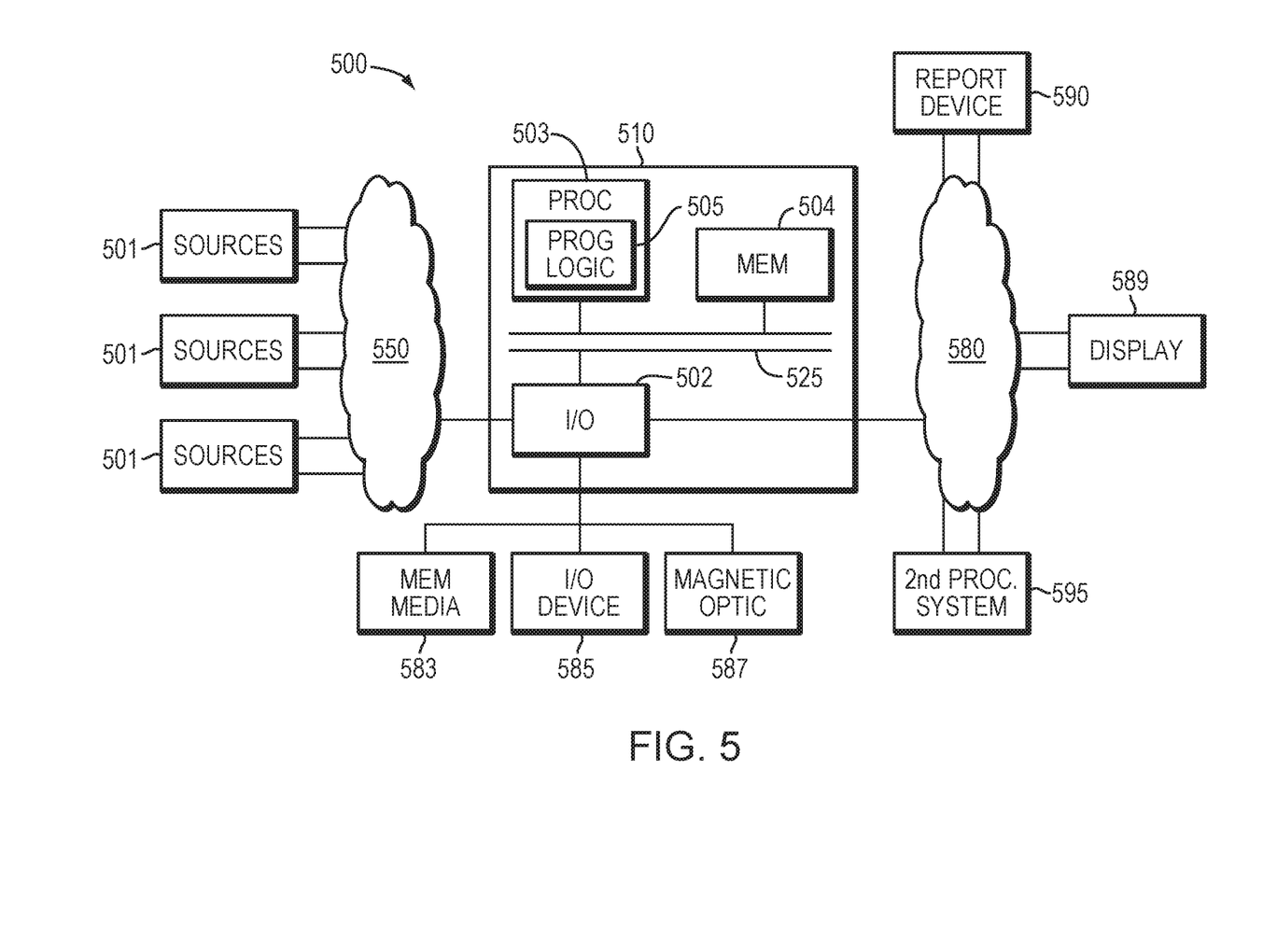
FIG. 5 is an example of an embodiment of an apparatus that may utilize the techniques described herein, in accordance with an embodiment of the present disclosure.

FIG. 5 is a block diagram illustrating an apparatus, such as a computer 510 in a network 500, which may utilize the techniques described herein according to an example embodiment of the present invention. The computer 510 may include one or more I/O ports 502, a processor 503, and memory 504, all of which may be connected by an interconnect 525, such as a bus. Processor 503 may include program logic 505. The I/O port 502 may provide connectivity to memory media 583, I/O devices 585, and drives 587, such as magnetic drives, optical drives, or Solid State Drives (SSD). FIG. 5 also illustrates sources 501, interconnects 550 and 580, $2^{nd}$ proc. System 595, display 589, and report device 590. When the program code is loaded into memory 504 and executed by the computer 510, the machine becomes an apparatus for practicing the invention. When implemented on one or more general-purpose processors 503, the program code combines with such a processor to provide a unique apparatus that operates analogously to specific logic circuits. As such, a general purpose digital machine can be transformed into a special purpose digital machine.

Figure 6:
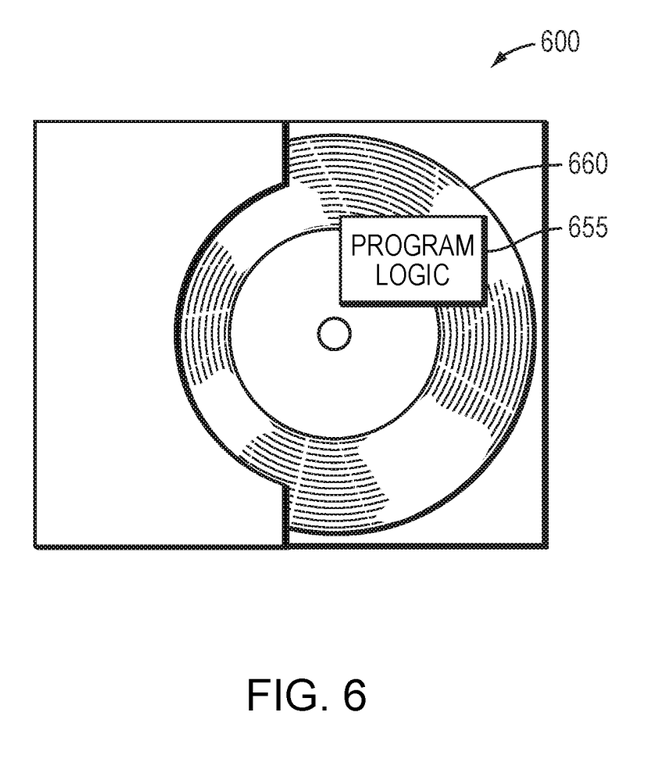
FIG. 6 is an example of a method embodied on a computer readable storage medium that may utilize the techniques described herein, in accordance with an embodiment of the present disclosure.

FIG. 6 is a block diagram illustrating a method embodied on a computer readable storage medium 660 that may utilize the techniques described herein according to an example embodiment of the present invention. FIG. 6 shows Program Logic 655 embodied on a computer-readable medium 660 as shown, and wherein the Logic is encoded in computer-executable code configured for carrying out the methods of this invention and thereby forming a Computer Program Product 600. Program Logic 655 may be the same logic 505 on memory 504 loaded on processor 503 in FIG. 5. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-4. For purposes of illustrating the present invention, the invention is described as embodied in a specific configuration and using special logical arrangements, but one skilled in the art will appreciate that the device is not limited to the specific configuration but rather only by the claims included with this specification.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible embodiments of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative embodiments, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
receiving an input/output ("IO") request for data, the data associated with a virtual block;
updating a reference count structure to reflect the IO request; and
deferring updating one or more reference counts associated with the virtual block to reflect the result of the IO request based on the updated reference count structure, wherein the updating the reference count structure comprises a consecutive block count representing consecutive storage locations of the one or more deferred references counts to be updated, wherein a single entry in the reference count structure represents the consecutive storage locations of the one or more respective deferred references counts.

2. The method of claim 1, wherein updating the reference count structure comprises:
storing the entry in the reference count structure, wherein the entry comprises a reference to the virtual block and the consecutive block count.

3. The method of claim 2, wherein the reference to the virtual block comprises an address of the virtual block and an offset.

4. The method of claim 1, wherein updating the one or more reference counts associated with the virtual block comprises:
grouping the entries in the reference count structure; and
updating the one or more reference counts associated with the virtual block based on the grouping.

5. The method of claim 4, wherein grouping the entries comprises:

identifying sets of related entries based on the references in the entries to respective virtual blocks.

6. The method of claim 1, wherein the reference count structure is a database.

7. A system, comprising:
one or more processors; and
computer-executable program logic operating in memory, wherein the computer executable program logic enables execution across the one or more processors of:
receiving an input/output ("IO") request for data, the data associated with a virtual block;
updating a reference count structure to reflect the IO request; and
deferring updating one or more reference counts associated with the virtual block to reflect the result of the IO request based on the updated reference count structure, wherein the updating the reference count structure comprises a consecutive block count representing consecutive storage locations of the one or more deferred references counts to be updated, wherein a single entry in the reference count structure represents the consecutive storage locations of the one or more respective deferred references counts.

8. The system of claim 7, wherein updating the reference count structure comprises:
storing the entry in the reference count structure, wherein the entry comprises a reference to the virtual block and the consecutive block count.

9. The system of claim 8, wherein the reference to the virtual block comprises an address of the virtual block and an offset.

10. The system of claim 7, wherein updating the one or more reference counts associated with the virtual block comprises:
grouping the entries in the reference count structure; and
updating the one or more reference counts associated with the virtual block based on the grouping.

11. The system of claim 10, wherein grouping the entries comprises:
identifying sets of related entries based on the references in the entries to respective virtual blocks.

12. The system of claim 7, wherein the reference count structure is a database.

13. A computer program product comprising:
a non-transitory computer readable medium encoded with computer executable program code, the code enabling execution across one or more processors of:
receiving an input/output ("IO") request for data, the data associated with a virtual block;
updating a reference count structure to reflect the IO request; and
deferring updating one or more reference counts associated with the virtual block to reflect the result of the IO request based on the updated reference count structure, wherein the updating the reference count structure comprises a consecutive block count representing consecutive storage locations of the one or more deferred references counts to be updated, wherein a single entry in the reference count structure represents the consecutive storage locations of the one or more respective deferred references counts.

14. The computer program product of claim 13, wherein updating the reference count structure comprises:
storing the entry in the reference count structure, wherein the entry comprises a reference to the virtual block and the consecutive block count.

15. The computer program product of claim 14, wherein the reference to the virtual block comprises an address of the virtual block and an offset.

16. The computer program product of claim 13, wherein updating the one or more reference counts associated with the virtual block comprises:
grouping the entries in the reference count structure; and
updating the one or more reference counts associated with the virtual block based on the grouping.

17. The computer program product of claim 16, wherein grouping the entries comprises:
identifying sets of related entries based on the references in the entries to respective virtual blocks.

18. The computer program product of claim 13, wherein the wherein the reference count structure is a database.

* * * * *